United States Patent
Goodrich et al.

(10) Patent No.: US 8,661,179 B2
(45) Date of Patent: Feb. 25, 2014

(54) CACHE MEMORY ARCHITECTURE HAVING REDUCED TAG MEMORY SIZE AND METHOD OF OPERATION THEREOF

(75) Inventors: Allen B. Goodrich, Modi'in (IL); Alex Rabinovitch, Kfar Yona (IL); Assaf Rachlevski, Modi'in (IL); Alex Shinkar, Rishon Lezion (IL)

(73) Assignee: Agere Systems LLC, Wilmington, DE (US)

( * ) Notice: Subject to any disclaimer, the term of this patent is extended or adjusted under 35 U.S.C. 154(b) by 793 days.

(21) Appl. No.: 12/245,437

(22) Filed: Oct. 3, 2008

(65) Prior Publication Data

US 2010/0088457 A1 Apr. 8, 2010

(51) Int. Cl.
*G06F 12/00* (2006.01)
(52) U.S. Cl.
USPC .............................................. 711/3; 711/118
(58) Field of Classification Search
None
See application file for complete search history.

(56) References Cited

U.S. PATENT DOCUMENTS

| | | | | |
|---|---|---|---|---|
| 6,449,694 | B1 * | 9/2002 | Burgess et al. | 711/128 |
| 6,564,311 | B2 * | 5/2003 | Kakeda et al. | 711/207 |
| 2006/0277352 | A1 * | 12/2006 | Pong | 711/3 |

OTHER PUBLICATIONS

"register" Focal Dictionary of Telecommunications, Focal Press 1999. Retrieved from http://www.credoreference.com/entry/bhfidt/register.*
Paul Bolotoff, "Funcational Principles of Cache Memory" Apr. 20, 2007. Retrieved from http://alasir.com/articles/cache_principles/cache_line_tag_index.html.*

* cited by examiner

*Primary Examiner* — Alford W. Kindred
*Assistant Examiner* — Daniel Tsui

(57) ABSTRACT

A cache memory architecture, a method of operating a cache memory and a memory controller. In one embodiment, the cache memory architecture includes: (1) a segment memory configured to contain at least one most significant bit (MSB) of a main memory address, the at least one MSB being common to addresses in a particular main memory logical segment that includes the main memory address, (2) a tag memory configured to contain tags that include other bits of the main memory address and (3) combinatorial logic associated with the segment memory and the tag memory and configured to indicate a cache hit only when both the at least one most significant bit and the other bits match a requested main memory address.

20 Claims, 3 Drawing Sheets

US 8,661,179 B2

CACHE MEMORY ARCHITECTURE HAVING REDUCED TAG MEMORY SIZE AND METHOD OF OPERATION THEREOF

TECHNICAL FIELD

The invention is directed, in general, to memory systems and, more specifically, to a cache memory architecture having reduced tag memory size and method of operation thereof.

BACKGROUND

Computer memory operating speed and cost bear a generally inverse relationship. Due to the tendency of computer programs to use (read from or write to) the same memory addresses repeatedly, stratified memory architectures, in which a relatively large but slow main memory is augmented with a relatively fast but small cache memory, have become commonplace. When a processor reads from a memory address, the data stored in that address in main memory are copied to the cache memory. When a processor writes to a memory address, the data are written at least to the cache memory. In either case, subsequent use of the same address may then be made with respect to the cache memory at typically far greater speed. Stratified memory architectures, if properly designed, are "transparent" to the processor and the computer programs.

Tags associate cache addresses, typically lines in the cache memory, with main memory addresses. Tags tend to be long. Consequently, tags require substantial memory, making them expensive and power consumptive to store.

SUMMARY

To address the above-discussed deficiencies, one aspect of the invention provides a cache memory architecture. In one embodiment, the cache memory architecture includes: (1) a segment memory configured to contain at least one most significant bit (MSB) of a main memory address, the at least one MSB being common to addresses in a particular main memory logical segment that includes the main memory address, (2) a tag memory configured to contain tags that include other bits of the main memory address and (3) combinatorial logic associated with the segment memory and the tag memory and configured to indicate a cache hit only when both the at least one MSB and the other bits match a requested main memory address.

Another aspect of the invention provides a method of operating a cache memory. In one embodiment, the method includes: (1) storing at least one MSB of a main memory address in a segment memory, the at least one MSB being common to addresses in a particular main memory logical segment that includes the main memory address, (2) storing tags that include other bits of the main memory address in a tag memory and (3) indicating a cache hit only when both the at least one MSB and the other bits match a requested main memory address.

Yet another aspect of the invention provides a memory controller. In one embodiment, the memory controller includes: (1) logic configured to control: (1a) a segment memory configured to contain at least one MSB of a main memory address, the at least one MSB being common to addresses in a particular main memory logical segment that includes the main memory address and (1b) a tag memory configured to contain tags that include other bits of the main memory address, (2) combinatorial logic configured to indicate a cache hit only when both the at least one MSB and the other bits match a requested main memory address and (3) a flush control unit configured to receive an output of the combinatorial logic.

The foregoing has outlined certain aspects and embodiments of the invention so that those skilled in the pertinent art may better understand the detailed description of the invention that follows. Additional aspects and embodiments will be described hereinafter that form the subject of the claims of the invention. Those skilled in the pertinent art should appreciate that they can readily use the disclosed aspects and embodiments as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawings, in which.

DETAILED DESCRIPTION OF CERTAIN ASPECTS AND EMBODIMENTS

As stated above, tags associate cache addresses, typically lines in the cache memory, with main memory addresses. Tags are long because they often include large parts of main memory addresses. As a result, conventional tag memories are relatively large and expensive. They are also power consumptive and often have timing issues, which reduces their speed.

Described herein are various embodiments of a cache memory architecture in which the tag memory size is allowed to be smaller than it would otherwise have to be. Recognizing that programs or the information (i.e., data) with which they operate are often stored in adjacent portions of main memory, the main memory may then be logically segmented into adjacent portions. As a result, the tags can be made smaller, and tag memory size can be reduced. Also described herein are various embodiments of a method of operating a cache memory that take advantage of the reduced tag memory size.

More specifically, disclosed embodiments of the invention are directed to cache memory architectures in which a reduced number of bits of main memory addresses are stored in the tag memory itself; one or more MSBs of the main memory addresses are stored as segment identifiers in one or more "segment" memories associated with the tag memory. According to the architecture, one or more segments of the main memory are cached at a time. Any access to an address space outside a cached main memory segment flushes and/or invalidates data in one of the already-cached segments as needed and according to the segment-replacement scheme. The corresponding segment register may then be loaded with a different value corresponding to a different main memory segment, and that different segment is then cached. In embodiments in which more than one main memory segment may be cached at a time, segment pointers are also stored in the tag memory to accommodate multiple segment registers.

Figure 1:
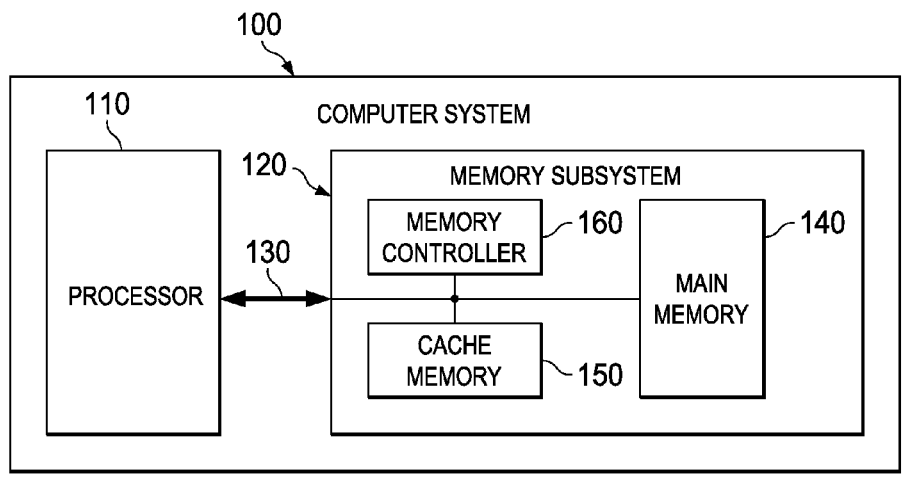
FIG. 1 is a high-level block diagram of a portion of a computer system employing a stratified memory architecture within which a cache memory architecture constructed according to the principles of the invention may operate.

FIG. 1 is a high-level block diagram of a portion of a computer system 100 employing a stratified memory architecture within which a cache memory architecture constructed according to the principles of the invention may operate. The computer system 100 includes a processor 110, which may be a processor of any conventional or later-developed type or architecture. The computer system 100 further includes a memory subsystem 120. A bus couples the processor 110 and the memory subsystem 120.

Within the memory subsystem 120 is located a main memory 140. The main memory 140 may be of any size or speed or of any conventional or later-developed type. The main memory 140 could itself be a cache memory for a still-larger memory, including nonvolatile, e.g., static random access memory (SRAM) or hard disk, storage. The main memory 140 may also assume any physical configuration. It is assumed for purposes of this discussion that, irrespective of how the main memory 140 may be physically configured, it logically represents one or more addressable memory spaces. It is that one or more addressable memory spaces that are divided into segments for purposes of cache memory management.

A cache memory 150 is also located in the memory subsystem 120. The cache memory 150 may be of any size or speed or of any conventional or later-developed type. A memory controller 160 is coupled to the main memory 140 and the cache memory 150 and is configured to control the main memory 140 and the cache memory 150, for example to copy or move data therebetween or maintain the memories through, e.g., periodic refresh or backup to nonvolatile storage (not shown). The memory controller 160 is configured to respond to requests, issued by the processor 110, to read or write data from or to the main memory 140. In doing so, the memory controller 160 may fulfill at least some of those data requests by instead reading or writing data from or to the cache memory 150. The memory controller 160 organizes the cache memory 150 into lines of plural main memory 140 addresses such that a single tag defines an entire line in the cache memory 150.

As those skilled in the pertinent art understand, a conventional memory controller compares a requested address with tags in a tag memory associated with a cache memory to determine whether or not it can fulfill the data request from the cache memory. The tag memory is arranged as a Cartesian (X by Y) array capable of storing X tags that are Y bits long each. If the certain requested main memory address matches a main memory address contained in a tag in the tag memory, a "hit" is said to have occurred, and the memory controller fulfills the data request using the cache memory. If the certain requested address matches no tag in the tag memory, a "miss" is said to have occurred, and the memory controller fulfills the data request using the main memory and copies the data to the cache memory. Various policies exist for replacing data in a cache memory but are outside the scope of this discussion.

The memory controller 160 may establish various associations between the main memory 140 and the cache memory 150. For example, the memory controller 160 may establish the cache memory 150 as set associative with the main memory 140. The set association may be of any number of "ways" (e.g., 2-way or 4-way), depending upon, e.g., the desired performance of the memory subsystem 120 or the relative sizes of the cache memory 150 and the main memory 140. Alternatively, the memory controller 160 may render the cache memory 150 as being fully associative with the main memory 140, in which case only one way exists. Those skilled in the pertinent art understand set and full association of cache and main memories. As stated above, the architecture of properly designed memory systems, including stratified memory systems and the manner in which their cache memories are be associated with their main memories, are transparent to the processor 110 and the computer programs that execute thereon. Various schemes exist for associating cache and main memories but are outside the scope of this discussion.

Figure 2:
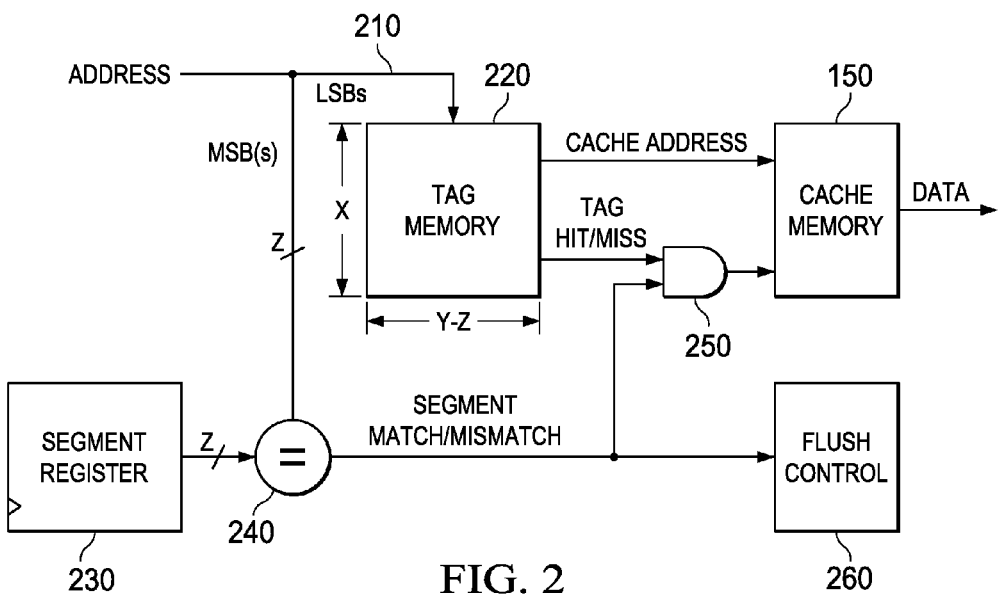
FIG. 2 is a schematic diagram of one embodiment of a cache memory architecture constructed according to the principles of the invention.

FIG. 2 is a schematic diagram of one embodiment of a cache memory architecture constructed according to the principles of the invention and configured to receive a requested main memory address via address lines 210. As stated above, the main memory 140 of FIG. 1 is logically divided into segments. For purposes of this discussion, it is assumed that the segments are of equal size and are divided such that the largest possible number of MSBs is common to all addresses in each segment. (For example, a 16 MB main memory may be logically divided into four 4 MB segments. If the main memory is logically divided such that the largest possible number of MSBs is common to all addresses in each segment, two MSBs of the addresses will be common to all addresses in each of the four segments.)

The cache memory architecture includes a tag memory 220 that, like the above-described conventional tag memory, is arranged as a Cartesian array and capable of storing X tags. However, unlike the conventional tag memory, the tag memory 220 is not configured to store all Y bits of each of the tags. Instead, the tag memory 220 is only an X by Y-Z bit array. It is configured to store only Y-Z bits of each of the tags and not to store Z bits of each tag. Instead, the Z bit(s), which are MSB(s) of the main memory address contained in each tag, are stored as a segment identifier in a small segment memory 230. In the embodiment of FIG. 2, the segment memory 230 is a Z-bit-wide segment register.

A requested main memory address is received from a "requester," perhaps from a processor or another level of cache memory, via the address lines 210. Z MSB(s) of the requested main memory address (Z being at least one) are routed to a comparator 240. Other bits of the data request are routed into the tag memory 220. In some embodiments, the "other bits" of the requested main memory address are only some (i.e., fewer than all) of the remaining bits of the requested main memory address. In other embodiments, "other bits" of the requested main memory address are all of the remaining bits of the requested main memory address. To establish whether or not the requested main memory address is a hit or a miss, conventional logic associated with the tag memory 220 compares the other bits of the requested main memory address with the other bits of main memory addresses contained in the tags in the tag memory 220. If a match does not occur, a miss occurs, and a logical zero, representing a tag miss, is provided to an AND gate 250. If a match occurs, a potential hit occurs, and a logical one, representing a tag hit, is provided to the AND gate 250. Concurrently, the MSB(s) routed to the comparator 240 are compared with the segment identifier contained in the segment memory 230. If a match does not occur, a miss occurs, and the comparator 240 provides a logical zero, representing a segment mismatch, to the AND gate 250. If a match occurs, a potential hit occurs, and the comparator 240 provides a logical one, representing a segment match, to the AND gate 250. If both a tag hit and a segment match occur, a hit actually occurs, both inputs to the AND gate 250 are logical one, and the output of the AND gate 250 is a logical one as a result, indicating a cache hit. In the embodiment of FIG. 2, the comparator 240 and the AND gate 250 may be regarded as combinatorial logic. In one embodiment, the combinatorial logic is located in the memory controller 160 of FIG. 1. Both a cache address and the output of the AND gate 250 are provided to the cache memory 150, which fulfills the data request with data as shown.

If the MSB(s) routed to the comparator 240 do not match the segment identifier contained in the segment memory 230, the comparator 240 provides a logical zero. In addition to the AND gate 250, a flush control unit 260 also receives this logical zero. The flush control unit 260 then determines whether or not the requested data is cacheable. If the requested data is cacheable, the flush control unit 260 invalidates the segment and flushes it if needed, loads the segment register with the new segment value, directs the memory controller 160 to fulfill the data request and caches the requested data when the data request is fulfilled. If the requested data is not cacheable, the flush control unit 260 directs the memory controller 160 to fulfill the data request from the main memory 140 of FIG. 1 without caching the requested data.

If the MSB(s) routed to the comparator 240 match the segment identifier contained in the segment memory 230, the comparator 240 provides a logical one. The flush control unit 260 then determines whether or not a hit has occurred with respect to the other bits of the address. If so, the cache memory 150 fulfills the data request. If not, the flush control unit 260 directs the main memory controller 160 to fulfill the data request from the main memory 140 and updates the cache memory 150 in accordance with a replacement policy.

Figure 3:
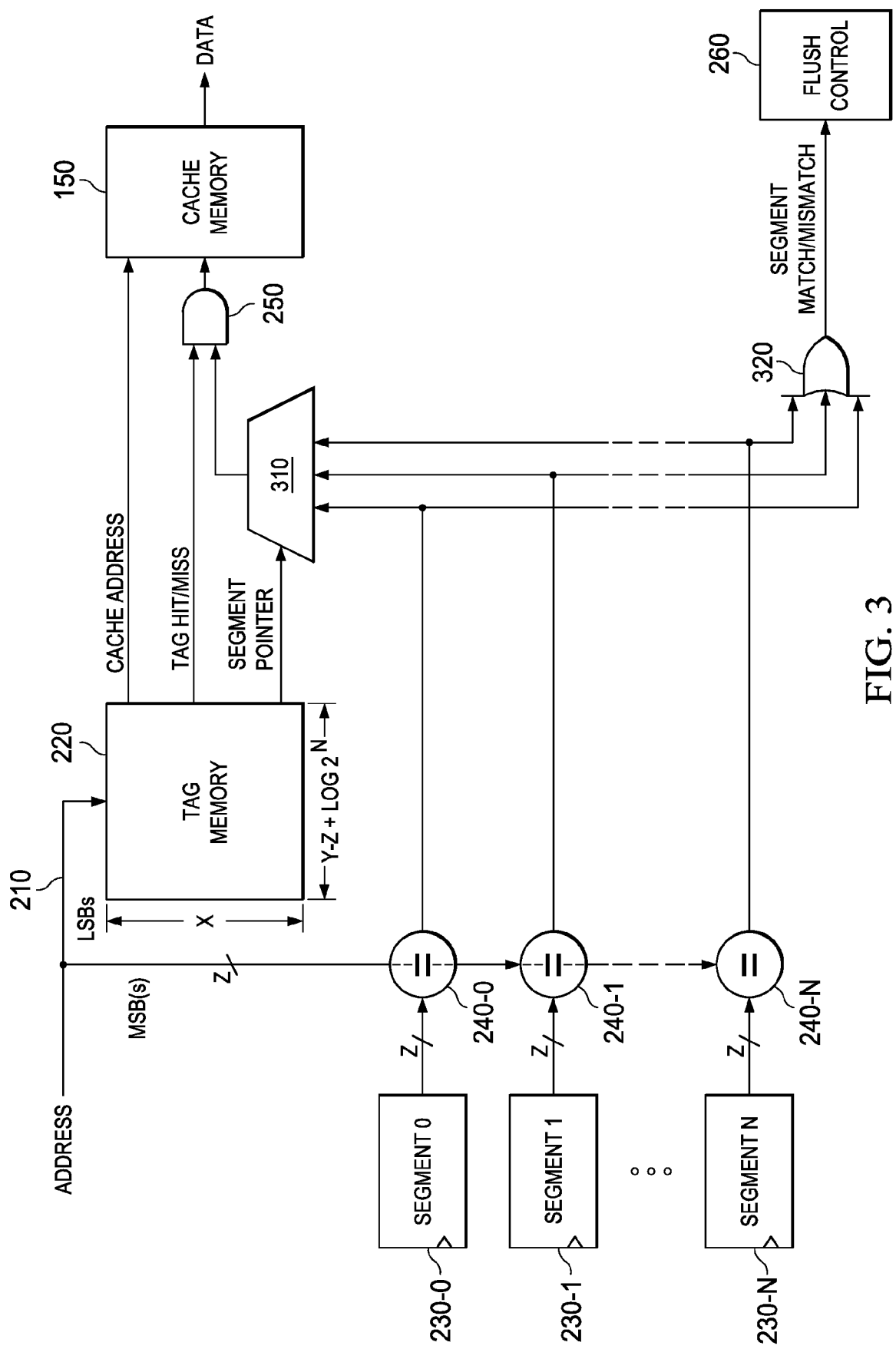
FIG. 3 is a schematic diagram of another embodiment of a cache memory architecture constructed according to the principles of the invention.

The embodiment of FIG. 2 allows only one segment to be cached at a time. However, some computer systems, particularly including those in which multiple programs are executing concurrently, may find an embodiment that allows more than one segment to be cached at a time advantageous. Accordingly, FIG. 3 is a schematic diagram of another embodiment of a cache memory architecture that allows N segments to be cached concurrently.

The address lines 210, tag memory 220, AND gate 250 and flush control 260 operate as described with respect to FIG. 2. However, in the embodiment of FIG. 3, the segment memory 230 takes the form of multiple segment registers 230-0, 230-1, . . . , 230-N, each configured to contain a single segment identifier. Of course, the segment memory 230 may take the form of a single memory configured to contain multiple segment identifiers. Multiple corresponding comparators 240-0, 240-1, . . . , 240-N are coupled to the segment registers 230-0, 230-1, . . . , 230-N. The tag memory 220 is also slightly larger to accommodate tags that are Y-Z+log $2^N$ bits long. The log $2^N$ bits are used as a segment pointer to associate each tag with one of the segment registers 230-0, 230-1, . . . , 230-N.

A requested main memory address is received from a requester via the address lines 210. Z MSB(s) of the address (Z being at least one) are routed to each of the comparators 240-0, 240-1, . . . , 240-N. The other bits of the requested main memory address are routed into the tag memory 220. To establish whether or not the requested main memory address is a hit or a miss, conventional logic associated with the tag memory 220 compares the other bits of the requested main memory address with the other bits of main memory addresses contained in the tags in the tag memory 220. If a match does not occur, a miss occurs, and a logical zero, representing a tag miss, is provided to the AND gate 250. If a match occurs, a potential hit occurs, and a logical one, representing a tag hit, is provided to the AND gate 250. The log $2^N$-bit segment pointer from the matching tag is also provided to a segment select multiplexer 310. Concurrently, the MSB(s) routed to the comparators 240-0, 240-1, . . . , 240-N are compared with the segment identifiers contained in the corresponding segment memories 230-0, 230-1, . . . , 230-N. If a match does not occur with any of the segment identifiers, a miss occurs, and the comparators 240-0, 240-1, . . . , 240-N provide logical zeroes, representing segment mismatches, to the segment select multiplexer 310. If a match occurs, a potential hit occurs with respect to one of the segments, and the corresponding comparator 240-0, 240-1, . . . , 204-N provides a logical one, representing a segment match, to the logic 310.

The segment select multiplexer 310 is configured such that the log $2^N$-bit segment pointer received from the tag memory 220 selects the output of only one of the comparators 240-0, 240-1, . . . , 240-N. Accordingly, the segment select multiplexer 310 provides the output of the selected one of the comparators 240-0, 240-1, . . . , 204-N to the AND gate 250.

If both a tag hit and a segment match occur, a hit actually occurs, both inputs to the AND gate 250 are logical one, and the output of the AND gate 250 is a logical one as a result, indicating a cache hit. In the embodiment of FIG. 3, the comparators 240-0, 240-1, . . . , 204-N, the segment select multiplexer 310 and the AND gate 250 may be regarded as combinatorial logic. In one embodiment, the combinatorial logic is located in the memory controller 160 of FIG. 1. Both a cache address and the output of the AND gate 250 are provided to the cache memory 150, which fulfills the data request with data as shown.

If the MSB(s) routed to the comparator 240 do not match any segment identifier contained in the segment memory 230, the segment select multiplexer 310 provides a logical zero. The memory controller 160 of FIG. 1 fulfills the data request from a different segment of the main memory 140 of FIG. 1. In one embodiment, the memory controller 160 treats the requested data as uncacheable and takes no further action (no invalidating or flushing is needed). In an alternative embodiment, the memory controller 160 invalidates and flushes one of the active segments, as needed, and copies the data fulfilling the data request to the cache memory 150 in accordance with a replacement policy. As a result, new tags are loaded into the tag memory 220, and a segment identifier corresponding to the different segment is loaded into the segment memory 230, allowing the different segment to be cached.

As stated above, if the other bits routed to the tag memory 220 do not match any other bits of main memory addresses contained in the tags in the tag memory 220, a miss occurs, and a logical zero is generated. The flush control unit 260 then determines whether or not the requested data is cacheable. If the requested data is cacheable, the flush control unit 260 invalidates one of the segments and flushes it if needed, loads the segment register with the new segment value, directs the memory controller 160 to fulfill the data request and caches the requested data when the data request is fulfilled. If the requested data is not cacheable, the flush control unit 260 directs the memory controller 160 to fulfill the data request from the main memory 140 of FIG. 1 without caching the requested data.

If the MSB(s) routed to the comparator 240 match one of the segment identifiers contained in the segment memory 230, and a logical one is generated. The flush control unit 260 then determines whether or not a hit has occurred with respect to the other bits of the address. If so, the cache memory 150 fulfills the data request. If not, the flush control unit 260 directs the main memory controller 160 to fulfill the data request from the main memory 140 and updates the cache memory 150 in accordance with a replacement policy.

In addition to the logic 310, an OR gate 320 receives the outputs of the comparators 240-0, 240-1, . . . , 240-N. If the MSB(s) routed to the comparators 240-0, 240-1, . . . , 240-N fail to match any of the segment identifiers contained in the segment memories 230-0, 230-1, . . . , 230-N, the OR gate 320 provides a logical zero. The flush control unit 260 receives the logical zero and responds by invalidating one of the segments according to a replacement policy and flushing it, if needed.

Figure 4:
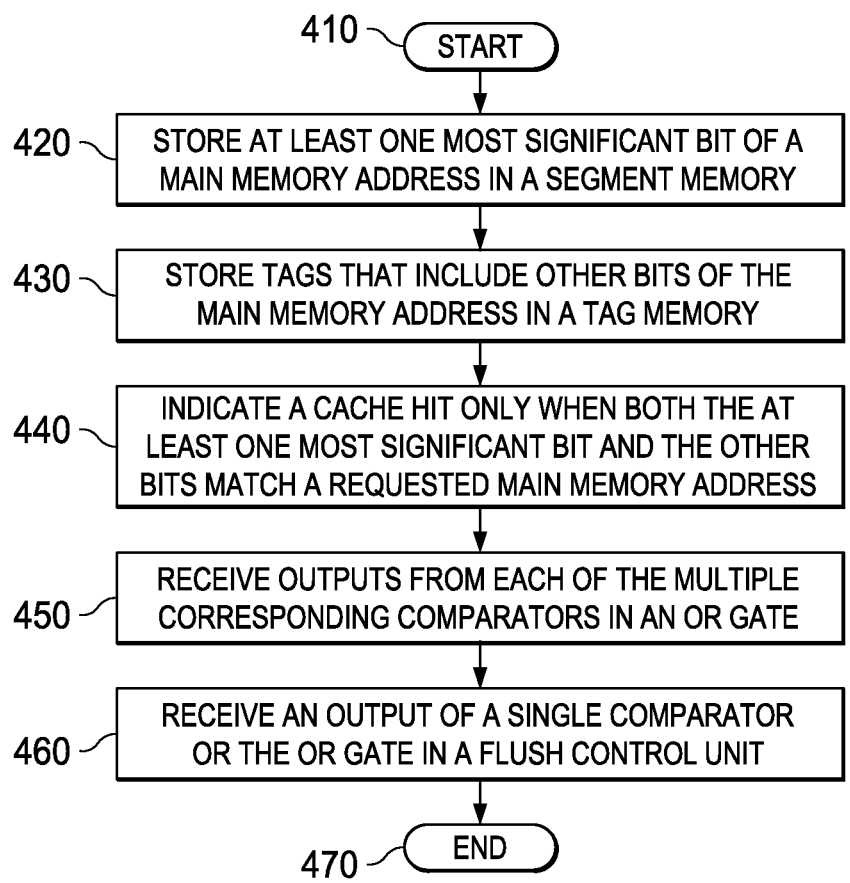
FIG. 4 is a flow diagram of one embodiment of a method of operating a cache memory carried out according to the principles of the invention.

FIG. 4 is a flow diagram of one embodiment of a method of operating a cache memory carried out according to the principles of the invention. The method begins in a start step 410. In a step 420, at least one MSB of a main memory address is stored in a segment memory. The at least one MSB is common to addresses in a particular main memory logical segment that include the main memory address. In a step 430, tags that include other bits of the main memory address are stored in a tag memory. In a step 440, a cache hit is indicated only when both the at least one MSB and the other bits match a requested main memory address. One embodiment of the method includes a step 450, in which outputs from each of multiple corresponding comparators are received in an OR gate. In a step 460, an output of the combinatorial logic is received in a flush control unit. In an embodiment that lacks the step 450, the flush control unit receives the output directly from the combinatorial logic. In the embodiment that includes the step 450, the flush control unit receives the output via the OR gate. The method ends in an end step 470.

The degree to which a tag memory may be reduced in size may be significant. For example, a 32 Kbyte cache memory with 64 byte cache lines contains 512 cache lines. If the cache memory is 16-way set associative, each way has 32 sets. A conventional tag size for a 4 Gbyte main memory therefore is 21 bits long. If, however, the main memory is divided into 4 Mbyte segments, the tag size becomes 11 bits. Adding a 2-bit segment pointer for a four-segment architecture results in a tag that is 13 bits long. Each tag is therefore 21−13=8 bits shorter, which allows the tag memory to be 4096 bits (16 ways*32 sets*8 bits) smaller. This translates to 4096 fewer flip flops in one type of tag memory.

Those skilled in the art to which the invention relates will appreciate that other and further additions, deletions, substitutions and modifications may be made to the described embodiments without departing from the scope of the invention.

What is claimed is:

1. A cache memory architecture including a cache memory, comprising:
a segment memory configured to contain at least one most significant bit of a main memory address, said at least one most significant bit being common to addresses in a particular main memory segment that includes said main memory address, wherein said segment memory is distinct and separate from said cache memory and a tag memory;
said tag memory configured to contain tags that include other bits of said main memory address; and
combinatorial logic associated with said segment memory and said tag memory and configured to concurrently compare said at least one most significant bit and said other bits to corresponding portions of a requested main memory address and indicate a cache hit only when both said at least one most significant bit and said other bits match said requested main memory address.

2. The cache memory architecture as recited in claim 1 wherein said at least one most significant bit is a segment identifier, said segment memory is further configured to contain a single segment identifier and said combinatorial logic includes a single comparator and an AND gate.

3. The cache memory architecture as recited in claim 1 wherein said at least one most significant bit is a segment identifier, said segment memory is configured to contain multiple segment identifiers, said tags include segment pointers and said combinatorial logic includes multiple corresponding comparators, a segment select multiplexer and an AND gate.

4. The cache memory architecture as recited in claim 3 further comprising an OR gate configured to receive outputs from each of said multiple corresponding comparators.

5. The cache memory architecture as recited in claim 1 wherein said particular main memory segment is an equal size relative to other main memory segments.

6. The cache memory architecture as recited in claim 1 further comprising a flush control unit configured to receive an output of said combinatorial logic.

7. The cache memory architecture as recited in claim 1 wherein said segment memory includes at least one segment register.

8. A method of operating a cache memory, comprising:
storing at least one most significant bit of a main memory address in a segment memory, said at least one most significant bit being common to addresses in a particular main memory segment that includes said main memory address, wherein said segment memory is separate and distinct from said cache memory and a tag memory;
storing tags that include other bits of said main memory address in said tag memory;
concurrently comparing said at least one most significant bit and said other bits to corresponding portions of a requested main memory address; and
indicating a cache hit only when both said at least one most significant bit and said other bits match said requested main memory address.

9. The method as recited in claim 8 wherein said at least one most significant bit is a segment identifier, said segment memory configured to contain a single segment identifier and said combinatorial logic including a single comparator and an AND gate.

10. The method as recited in claim 8 wherein said at least one most significant bit is a segment identifier, said segment memory configured to contain multiple segment identifiers, said tags including segment pointers and said combinatorial logic including multiple corresponding comparators, a segment select multiplexer and an AND gate.

11. The method as recited in claim 10 further comprising receiving outputs from each of said multiple corresponding comparators in an OR gate.

12. The method as recited in claim 8 wherein said particular main memory segment is an equal size relative to other main memory segments.

13. The method as recited in claim 8 further comprising receiving an output of said combinatorial logic in a flush control unit.

14. The method as recited in claim 8 wherein said segment memory includes at least one segment register.

15. A memory controller coupled to a cache memory comprising:
logic configured to control:
a segment memory configured to contain at least one most significant bit of a main memory address, said at least one most significant bit being common to addresses in a particular main memory segment that includes said main memory address, wherein said segment memory is separate and distinct from said cache memory and a tag memory, and said tag memory configured to contain tags that include other bits of said main memory address;

combinatorial logic configured to concurrently compare said at least one most significant bit and said other bits to corresponding portions of a requested main memory address and indicate a cache hit only when both said at least one most significant bit and said other bits match said requested main memory address; and a flush control unit configured to receive an output of said combinatorial logic.

16. The memory controller as recited in claim 15 wherein said at least one most significant bit is a segment identifier, said segment memory is further configured to contain a single segment identifier and said combinatorial logic includes a single comparator and an AND gate.

17. The memory controller as recited in claim 15 wherein said at least one most significant bit is a segment identifier, said segment memory is configured to contain multiple segment identifiers, said tags include segment pointers and said combinatorial logic includes multiple corresponding comparators, a segment select multiplexer and an AND gate.

18. The memory controller as recited in claim 17 further comprising an OR gate configured to receive outputs from each of said multiple corresponding comparators.

19. The memory controller as recited in claim 15 wherein said particular main memory segment is an equal size relative to other main memory segments.

20. The memory controller as recited in claim 15 wherein said segment memory includes at least one segment register.

\* \* \* \* \*